April 23, 1940.  L. S. WILCOXSON  2,198,446
WASTE LIQUOR RECOVERY APPARATUS
Filed Aug. 22, 1936  4 Sheets-Sheet 1

INVENTOR.
Leslie S. Wilcoxson
BY
ATTORNEY.

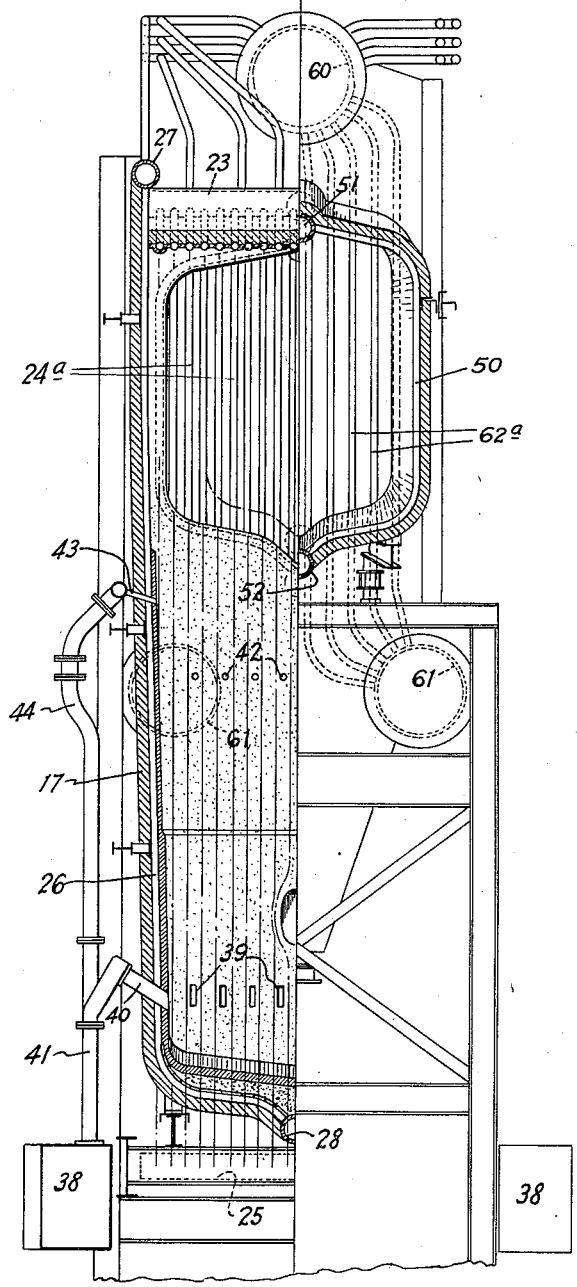

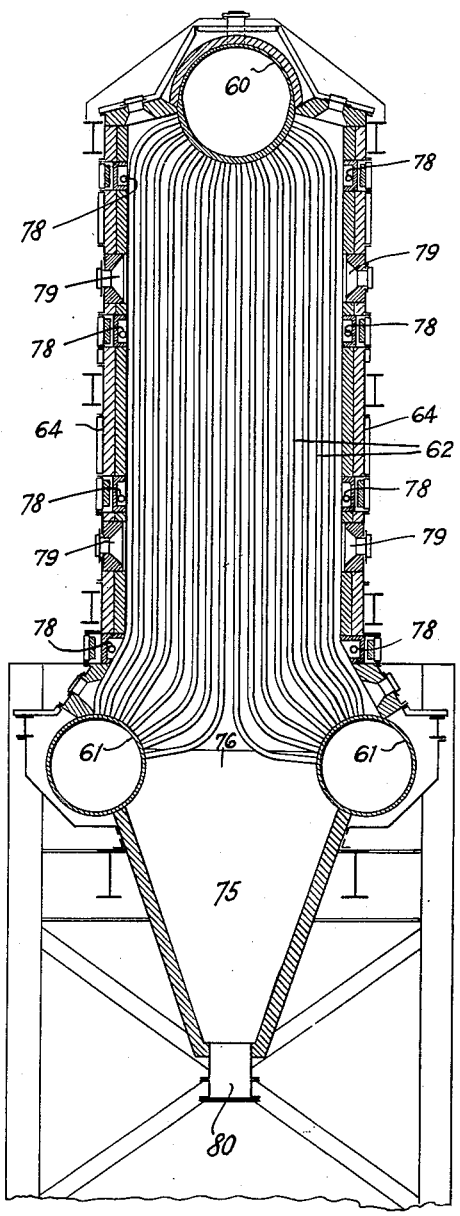

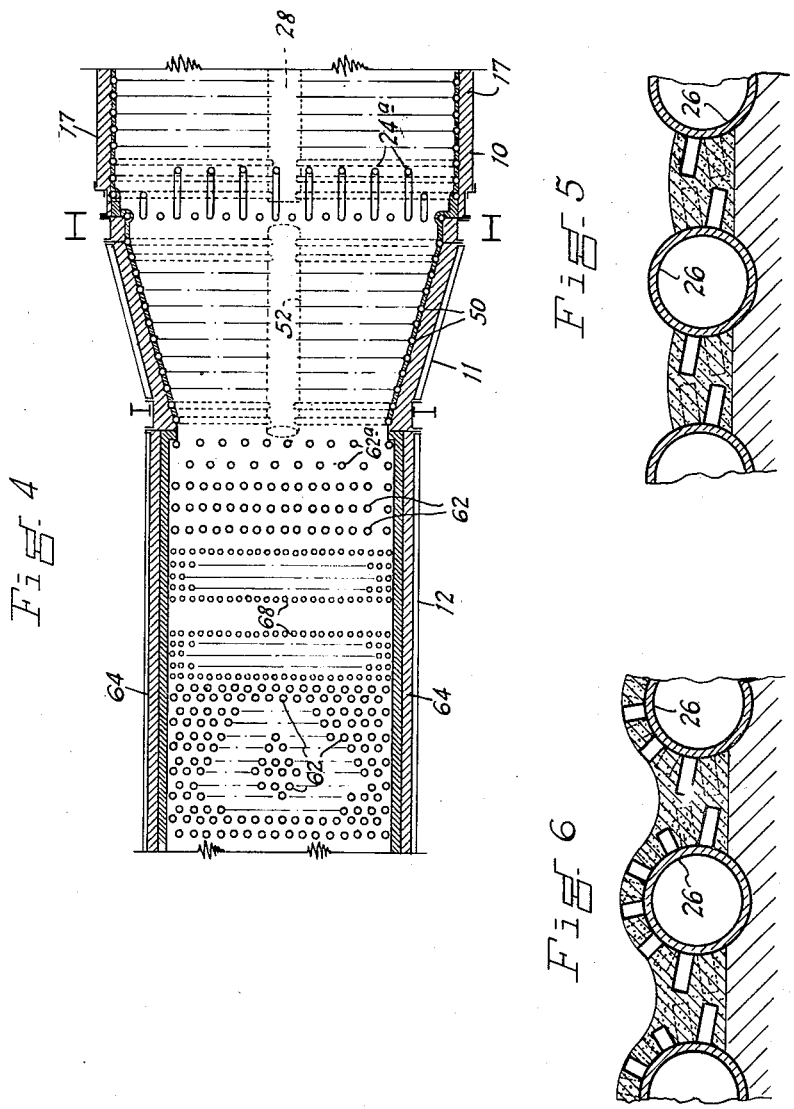

Patented Apr. 23, 1940

2,198,446

UNITED STATES PATENT OFFICE 2,198,446

WASTE LIQUOR RECOVERY APPARATUS

Leslie S. Wilcoxson, Ridgewood, N. J., assignor to The Babcock & Wilcox Company, Newark, N. J., a corporation of New Jersey Application August 22, 1936, Serial No. 97,323

3 Claims. (Cl. 23—277)

The present invention relates in general to apparatus for the recovery of chemicals and/or heat from waste liquor, and more particularly to the construction and operation of recovery units for recovering chemicals and/or heat from pulp digester residual liquor in the sulphate, soda or sulphite processes of manufacturing paper pulp.

One form of recovery unit for this purpose is disclosed in my prior joint application with G. H. Tomlinson, Serial No. 21,836, filed May 16, 1935. The function of such recovery units is to process the residual or "black" liquor resulting from the pulp digester cooking operation for the conversion of certain chemical constituents into a useful form and from the heat evolved in this process to generate steam at economical pressure and temperature. In general, the black liquor is sprayed into the furnace through one or more spray nozzles in such a manner as to deposit and distribute the liquor on one or more furnace walls, where it dries and forms a combustible char which ultimately falls and is burned in a fuel bed on the furnace hearth. When the recovery unit is used in the sulphate process of manufacturing pulp, salt cake to make up chemical losses in the process may be advantageously mixed with the black liquor prior to its spraying. The inorganic constituents are smelted in the fuel bed and drained continuously from the furnace hearth to a dissolving tank. The high temperature gases generated pass out of the upper end of the furnace into an associated steam boiler and their heat is utilized for the generation of steam for power and process purposes.

The chemical recovery efficiency of the unit is proportional to the chemical losses in the recovery process. The chemical losses have been found to be mainly due to mechanical entrainment of black liquor solids and particles of salt cake in the outgoing heating gases, and sublimation of chemicals in the furnace. It is generally understood that the loss of chemical by sublimation is due to the breakdown and volatilization of chemical compounds at the temperatures which exist in the fuel bed and furnace, and upon cooling, these vapors condense into molecular sized particles with possibly further reactions taking place between the particles of solid matter and the gases.

Various types of collection apparatus have heretofore been used for the recovery of chemical from the stack gases, such as electrostatic precipitators, washers, cyclones, and the like. For the maximum efficiency of such apparatus, it is desirable to minimize the amount of excess air employed in the furnace, and thereby the volume of heating gases passing through the steam boiler to the collection apparatus. A relatively large amount of chemical is continuously deposited on the boiler heating surface. The deposits on the boiler tubes adjacent the furnace tend to fuse or cake on the tube surface, while the deposits on the boiler tubes more remote from the furnace are generally in the form of dust. In either case the heat transfer efficiency of the heating surface will be impaired and the flow area for the gases reduced with a consequent increase in draft loss. A regular schedule of tube cleaning operations must ordinarily be maintained to keep the unit in efficient operation.

The general object of my present invention is the provision of improved apparatus for recovering heat and/or chemicals from waste liquor of the character described. A further and more specific object is the provision of a recovery unit in which the amount of material leaving the furnace is reduced, deposition of the material on the steam boiler heating surface minimized, and any deposits thereon rapidly removed from the path of the heating gases. Another object is the provision of an improved conduit construction for connecting the furnace and steam boiler.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 2 is an enlarged vertical section taken partly on the line 2—2 and partly on the line 2ª—2ª of Fig. 1;

Fig. 3 is an enlarged vertical section of the steam boiler taken on the line 3—3 of Fig. 1;

Fig. 4 is an enlarged horizontal section taken on the line 4—4 of Fig. 1;

Fig. 5 is a horizontal section taken on the line 5—5 of Fig. 1; and

Fig. 6 is a horizontal section taken on the line 6—6 of Fig. 1.

Figure 1:
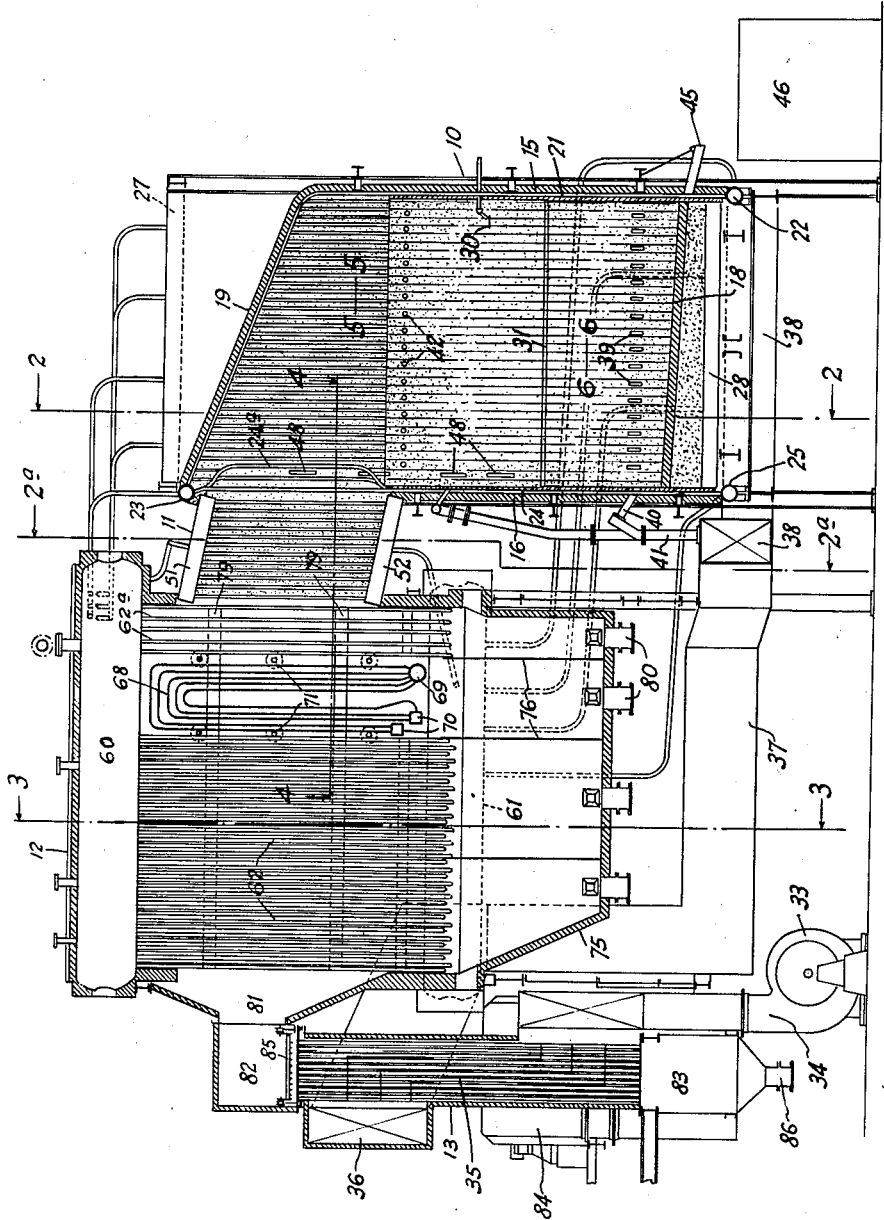
Fig. 1 is a sectional elevation of a recovery unit constructed in accordance with my invention.

In the embodiment of the invention illustrated, the recovery unit has for its main elements a vertical recovery furnace 10, a connecting throat conduit 11, a steam boiler 12, and an air heater 13, relatively arranged as shown in Fig. 1. The recovery furnace illustrated is defined by vertical fluid cooled walls including a front wall 15, a rear wall 16, and side walls 17, held in position by suitable steel structural members. The bottom of the furnace is formed by a trough-shaped rearwardly inclined fluid cooled refractory hearth 18. The upper end of the recovery furnace is closed throughout its area by a rearwardly inclined fluid cooled arch 19. In the upper portion of the rear wall 16 is formed a heating gas exit opening 20 through which the heating gases generated in the furnace pass to the steam boiler 12.

Each of the furnace walls is provided with a row of horizontally spaced vertical water tubes having a multiplicity of stud projections welded thereon for supporting an application of plastic refractory material. Front wall tubes 21 extend upwardly along the front wall from a transverse header 22 at the lower end of the front wall and along the arch 19 to a transverse header 23 at the upper end of the rear wall. Rear wall tubes 24 extend upwardly along the rear wall from a transverse lower header 25 to the upper header 23. A row of tubes 26 extends upwardly along each side wall to a horizontal header 27. The lower ends of both rows of tubes 26 are bent inwardly through the hearth structure and connected to a common longitudinally extending header 28. As illustrated in Fig. 1, the lower headers 22, 25 and 28 are arranged to receive water through suitable connections from a lower drum of the steam boiler, while the upper headers 23 and 27 are connected into an upper drum of the boiler, to provide an upward flow of fluid through the furnace wall tubes. As indicated in Fig. 2, the side walls 17 are shaped to provide a slight flaring towards its upper end. A furnace of rectangular cross-section is thus defined, with its side walls longer than the front and rear walls. The portions of the wall tubes 21, 24 and 26 below the level of the heating gas exit 20 are fully studded tubes, as indicated in Fig. 6, while the portions of the tubes 21 and 26 thereabove are only partially studded, as indicated in Fig. 5.

The provisions for introducing and burning the waste liquor are of the type disclosed and claimed in my prior joint application with F. G. Ely, Serial No. 23,406, filed May 25, 1935, and comprise a spray nozzle 30 mounted in the front wall 15 and arranged to project a relatively flat spray of concentrated liquor against the wall 16 and side walls 17. The spray nozzle 30 may be advantageously provided with a suitable nozzle oscillating mechanism for varying the area of impact of the sprayed particles on the rear and side walls, as disclosed in my last mentioned prior joint application. The liquor spray is regulated to produce spray particles of sufficient size and at sufficient velocity that the particles will not burn during transit but will be dried sufficiently by contact with the ascending heating gases to be in a sticky condition on impacting on the rear and side walls. The particles tend to coalesce on the walls and form an adhering mass of char which builds out into the furnace. The material remains on the walls until most of the remaining moisture is evaporated and the gravity effect on the mass causes lumps of various size to break off and fall through the furnace onto the hearth 18. The rear and side walls of the furnace have their refractory material arranged to form a ledge 31 for deflecting any material running down these walls inwardly away from the subjacent primary air ports hereinafter described.

The air required for combustion is preferably supplied to the recovery furnace at two levels therein, primary air being introduced adjacent the hearth, and secondary air above the level of the char mass. The air supply provisions include a forced draft fan 33 delivering air through a conduit 34 around the gas tubes 35 of the air heater 13. The preheated air passes downwardly from the air outlet chamber 36 through a pair of ducts 37 at opposite sides of the boiler to a U-shaped wind box 38 extending around the side and rear walls of the furnace. Vertically elongated primary air ports 39 are formed in the side and rear walls of the furnace between the corresponding wall tubes and at a level adjacent to the desired upper level of the bed of char normally present on the hearth 18. A downwardly directed nozzle 40 is mounted in each of the primary air ports and connected in groups by ducts 41 to the wind box 38. With this arrangement the bed of char on the hearth will be penetrated by downwardly impinging streams of preheated air on three sides providing suitable conditions for rapid combustion of the char. A row of round secondary air ports 42 is formed in each of the side walls 17 and at a lower level in the rear wall 16 in which nozzles 43 are mounted and connected in groups by ducts 44 to corresponding ducts 41. Suitable regulating provisions are provided to control the supply of air to the corresponding nozzles.

In normal operation the chemicals in the char collecting on the hearth will fuse and flow downwardly through the bed and along the hearth towards the front wall 15 which is provided with a discharge opening at the front end of the hearth for a smelt spout 45 arranged to discharge into a dissolving tank 46.

With the recovery furnace constructed as shown and described, the furnace is started up by employing an auxiliary fuel, such as wood or oil, and heated to a relatively high temperature before introducing the black liquor. The black liquor together with the powdered salt cake is then delivered to the spray nozzle and discharged against the side and rear walls to form successive layers of char thereon. The lumps of char separating from the walls drop into the lower section of the furnace onto the hearth where the combustible organic content is burned and the inorganic solids fused. The products of combustion from the lower section ascend in the furnace past and in contact with the deposited char and through the spray stream. In the upper section, the secondary air introduced effects the combustion of any unburned gases in the ascending stream including any combustible volatiles distilled from the char on the walls. The products of combustion at a temperature normally around 1700° F. pass out of the upper portion of the furnace to the associated steam boiler.

The recovery unit is advantageously constructed to minimize the carry-over of chemicals and char from the furnace to the steam boiler, the deposition thereof in the boiler, and the necessity for chemical collection apparatus in the stack. Among the provisions for this purpose is the arrangement of the upper portions of the rear wall tubes 24 to form a screen across the furnace gas exit opening 20. As shown in Figs. 1, 2 and 4, the upper portions of alternate tubes 24 are bent inwardly as indicated at 24ᵃ to form a second row of tubes widely spaced from the remaining tubes 24. The upper portions of the two end tubes 24 are also bent inwardly but to a lesser extent than the tube portions 24ᵃ. The chemical fumes in the heating gases tend to condense and the solid particles to collect on the screen so formed, and to either flow down or fall from the screen tubes onto the hearth. Lance openings 48 are arranged in the side walls opposite the screen to permit cleaning of the screen tubes.

The furnace exit opening 20 conforms in cross-section to the throat section 11 connecting the furnace and steam boiler of the unit. The throat section 11 is inclined and tapered toward its rear end and its walls defined by oppositely bent rows of water tubes 50 partially studded as indicated in Fig. 5. The upper and lower end portions of the tubes 50 are bent inwardly into common rearwardly inclined upper and lower headers 51 and 52 respectively, as shown in Fig. 2. The header 51 is connected into the upper drum of the steam boiler, while the header 52 is connected into one or both of the lower drums of the boiler to provide an upward flow of fluid through the wall tubes 50. The presence of a relatively high percentage of water vapor in the outgoing heating gases increases gas radiation and enables the throat to exert a substantial cooling effect on the gases. The throat section also acts as a gravity separating chamber and any material deposited on its inclined bottom may drain or be returned to the furnace by a lancing operation.

The steam boiler element of the recovery unit is arranged and constructed to minimize the head room requirements of the unit, lessen the amount of dust deposited in the boiler, and to facilitate the cleaning of the boiler heating surface. As shown in Figs. 1 to 4, the steam boiler is of the three-drum type, including a longitudinally extending upper drum 60 and a pair of lower drums 61 parallel thereto. Each of the drums 61 is connected to the drum 60 by a bank of water tubes 62 having vertically arranged straight portions relatively arranged to form a single tube bank and bent end portions connected to the corresponding drums. The boiler tube bank is enclosed by a setting or housing having a pair of parallel vertical side walls 64 which define the path of the heating gases. The boiler tube bank is divided into two spaced groups of tubes, with the space therebetween occupied by a steam superheater. The tube rows in the front group are more widely spaced apart than the tubes in the rear group to form a tube screen which functions to intercept the chemical carry-over from the furnace and to lower the temperature of the heating gases sufficiently to avoid overheating of the superheater tubes. The two front rows of slag screen tubes 62ᵃ are arranged in a staggered formation, as shown in Fig. 4, while corresponding tubes in the remaining rows of the front group are arranged in alignment. The boiler tubes in the rear group are arranged in staggered rows for more efficient heat absorption.

The steam superheater incorporated in the boiler is of the self-draining type, and is formed by parallel rows of U-shaped tubes 68 each having one end connected to an inlet header 69 and its other end connected to one of a pair of outlet headers 70. The inlet header 69 is connected to the upper boiler drum 60 in the usual manner to receive the steam generated. The steam passes from the inlet header 69 through the group of superheater tubes to the outlet headers 70 from which it is delivered to the point of utilization. The superheater tubes are, as shown, of smaller diameter and more closely spaced than the boiler tubes. Corresponding superheater tubes in each row are arranged in alignment to minimize the deposition of dust thereon, and to facilitate cleaning of the superheater by the rotatable soot blowing elements 71 extending across the boiler setting at opposite sides of the superheater or by lancing.

The use of a three-drum type steam boiler for the main heat recovery element of the unit is particularly advantageous as it permits the lower boiler drums 61 to be arranged at the sides of the boiler setting out of the main path of gas flow, and a minimum portion thereof exposed for the deposition of furnace dust thereon. The space between the lower drums 61 and the arrangement of the major portion of the boiler tube surface above the space permits most of the material falling through the intertube spaces to drop clear of the lower drums. As shown in Figs. 1 and 3, the portion of the boiler setting below the tube bank is formed by a V-shaped hopper 75 divided into longitudinal compartments by transverse partitions 76 to prevent by-passing of the heating gases around the boiler heating surface. The partitions 76 are relatively arranged to form separate compartments below the boiler slag screen and superheater.

The side walls of the boiler setting, as shown in Fig. 3, are provided with recessed rotatable tube cleaning elements 78 extending longitudinally thereof at different levels and arranged to discharge jets of cleaning fluid into the sides of the tube bank. Rows of lance doors 79 also extend along the tube bank at different levels for the insertion of hand steam lances. The illustrated arrangement of the tube cleaning elements and provisions is particularly advantageous to cause the tube deposits to be blown inwardly away from the boiler drums 61 and in position to fall freely into the dust hopper. Each hopper compartment is provided with a gate-controlled discharge pipe 80 through which the deposited dust may be removed. When the recovery unit is employed in the sulphate process of manufacturing pulp, the dust recovered in the forward portion of the boiler tube bank will be partly sodium carbonate ($Na_2CO_3$) and partly sodium sulphate ($Na_2SO_4$), while in the rear portion the deposited dust will be practically pure sodium sulphate. The chemicals recovered are returned to the furnace either by a manual operation or by mixing the same together with the salt cake with the black liquor prior to its introduction through the spray nozzle. The single pass construction of the boiler with the boiler tubes vertical substantially throughout their length greatly contributes to reducing the amount of dust deposited in the boiler.

The rear end of the boiler setting has a restricted gas outlet 81 opening to the gas inlet chamber 82 of the air heater. The air heater tubes 35 have their opposite ends opening through tube sheets in the gas inlet chamber 82 and gas outlet chamber 83, so that the heating gases will pass through the tubes 35 in heat transfer relation with the air flowing around the tubes in a countercurrent direction. One or more soot blowers 85 are arranged to move across the upper tube sheet and discharge jets of cleaning fluid into the tubes 35. The chamber 83 has a discharge opening 86 for removing dust deposited therein. The flow of heating gases from the furnace through the throat 11, steam boiler, and air heater is maintained by an induced draft fan 84 leading to the usual stack (not shown), in which additional chemical collecting apparatus may be located, if economically desirable.

The recovery apparatus described is characterized by its high liquor treating capacity, relatively low cost of maintenance and operation, high steam generating capacity, and effective provisions for the recovery of chemicals from the heating gases.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features. In the claims, the term "dust" is employed to generically cover material carried over from the furnace by the heating gases whether in the form of dust or molten particles.

I claim:

1. In a chemical recovery unit comprising a recovery furnace having means for burning waste liquor therein and liquefying the incombustible constituents of said liquor, a heating gas outlet in the upper part of one wall thereof and a smelt outlet in the lower part thereof, and a steam boiler arranged at one side of said furnace and comprising a bank of vertically extending steam generating tubes and a dust-collecting hopper below said tube bank, the improvement which comprises the provision of walls forming a throat of substantial length connecting said furnace gas outlet to said steam boiler, means for reducing carry-over of chemicals from said recovery furnace through said throat including furnace wall tubes arranged to form a fluid cooled screen across the furnace end of said throat, and tubes in the portion of said tube bank nearest said throat being arranged in a more widely spaced formation than the tubes in the remaining portion of said tube bank to form a fluid cooled screen extending across the boiler end of said throat.

2. In a chemical recovery unit comprising a recovery furnace having means for burning waste liquor therein and liquefying the incombustible constituents of said liquor, a heating gas outlet in the upper part of one wall thereof and a smelt outlet in the lower part thereof, and a steam boiler arranged at one side of said furnace and comprising a bank of vertically extending steam generating tubes and a dust-collecting hopper below said tube bank, the improvement which comprises the provision of fluid cooled walls forming an inclined throat of substantial length connecting said gas outlet to said steam boiler, means for reducing carry-over of chemicals from said recovery furnace through said throat including furnace wall tubes arranged to form a fluid cooled screen across the lower end of said throat, and tubes in the portion of said tube bank nearest said throat being arranged in a more widely spaced formation than the tubes in the remaining portion of said tube bank to form a fluid cooled screen extending across the upper end of said throat.

3. In a chemical recovery unit comprising a recovery furnace having means for burning waste liquor therein and liquefying the incombustible constituents of said liquor, a heating gas outlet in the upper part of one wall thereof and a smelt outlet in the lower part thereof, and a steam boiler arranged at one side of said furnace and comprising a bank of vertically extending steam generating tubes and a dust-collecting hopper below said tube bank, the improvement which comprises the provision of walls forming an inclined throat of substantial length connecting said gas outlet to said steam boiler, means for reducing carry-over of chemicals from said recovery furnace through said throat including water tubes arranged to fluid cool the walls of said throat, furnace wall tubes arranged to form a fluid cooled screen across the lower end of said throat, tubes in the portion of said tube bank nearest said throat being arranged in a more widely spaced formation than the tubes in the remaining portion of said tube bank to form a fluid cooled screen extending across the upper end of said throat, and means connecting said throat wall tubes into the circulation system of said boiler.

LESLIE S. WILCOXSON.